Aug. 11, 1931.  E. A. LAURENT  1,818,857

AUTOMOBILE SIGNAL LAMP

Filed Feb. 14, 1928  2 Sheets-Sheet 1

INVENTOR.
E. A. Laurent
BY
ATTORNEY.

Aug. 11, 1931.  E. A. LAURENT  1,818,857
AUTOMOBILE SIGNAL LAMP
Filed Feb. 14, 1928  2 Sheets-Sheet 2
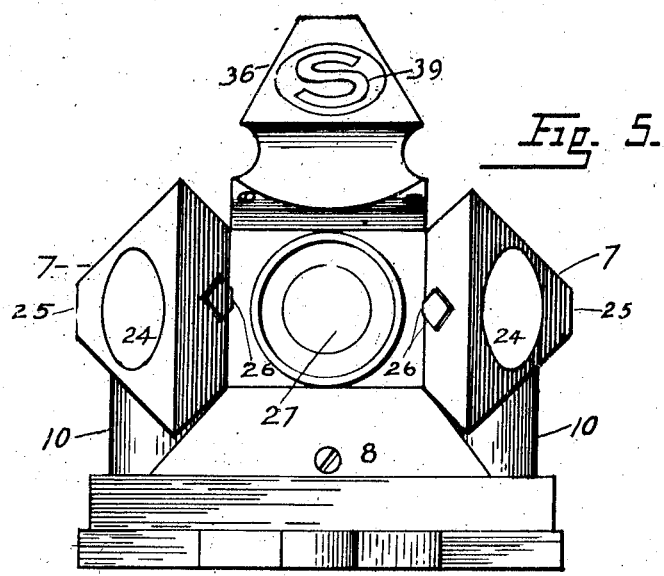
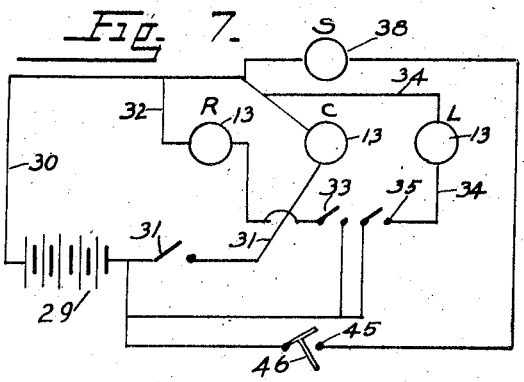
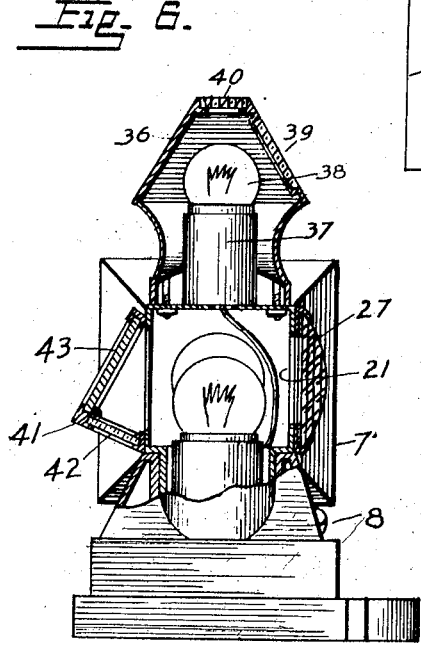
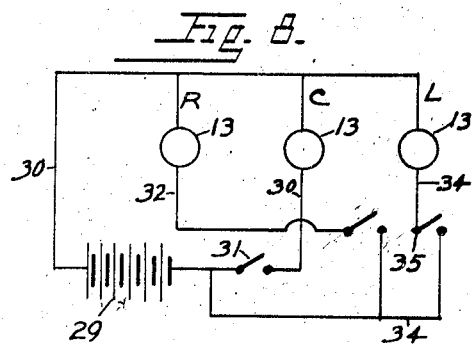
INVENTOR.
E. A. Laurent
BY
ATTORNEY.

Patented Aug. 11, 1931

1,818,857

UNITED STATES PATENT OFFICE

EMILE A. LAURENT, OF DENVER, COLORADO

AUTOMOBILE SIGNAL LAMP

Application filed February 14, 1928. Serial No. 254,264.

My invention relates to signal lamps for motor-driven vehicles and its main object is to provide a lamp of this kind which in a simple though highly effective manner, will designate the direction in which a vehicle to which it is applied is to be turned. Another object is to provide a signal lamp which may be readily converted for use at either the front end or rear end of an automobile. A further object is to provide in connection with the lamp, if used at the rear end of the vehicle, a stop-signal and means to illuminate a license plate. A further object of the invention is to provide a signal lamp of the above stated characteristics, which shall be highly ornamental and which in practise, functions at night, as a safety device in straightway driving as well as when changing direction, and still other objects reside in details of construction and a novel arrangement of parts as will fully appear in the course of the following description.

Figures 1, 3:
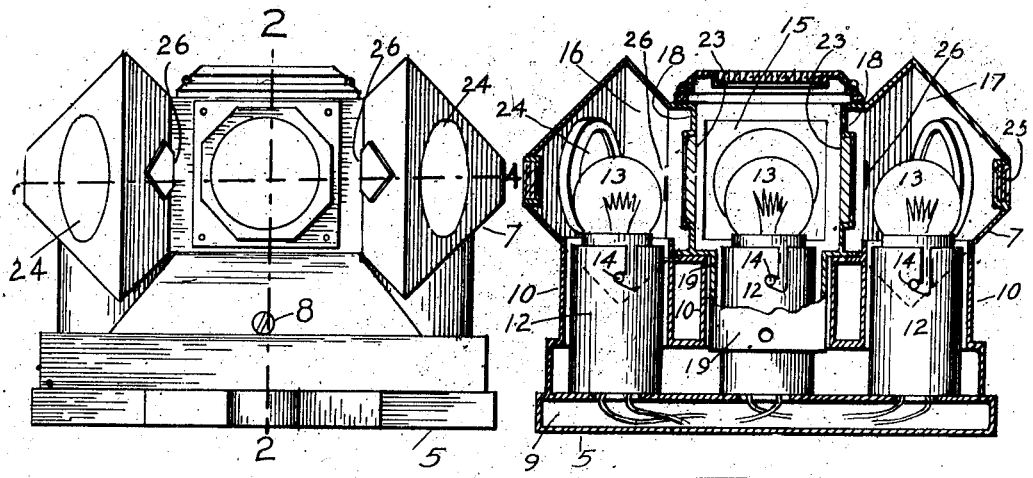
Figure 2:
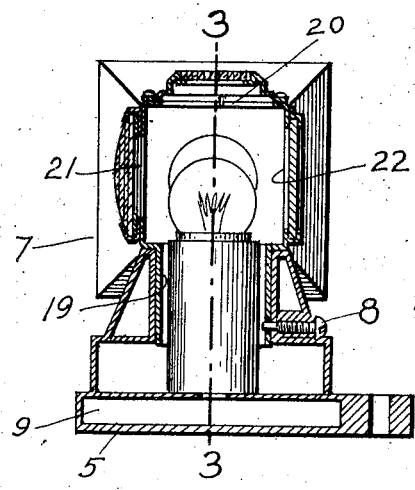
Figure 4:
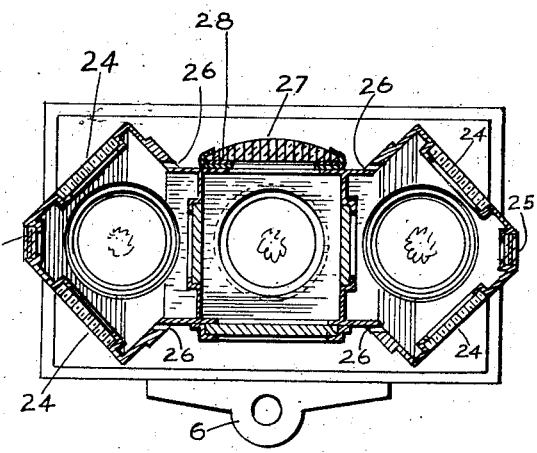

An embodiment of the invention has been illustrated in the accompanying drawings in the several views of which like parts are similarly designated and in which, Figure 1 represents an elevation of the signal lamp as adapted for use at the front end of a vehicle;

Figure 2 a vertical section along the line 2—2 Figure 1;

Figure 3 a section taken on the line 3—3 Figure 2;

Figure 4, a horizontal section in the plane indicated by the line 4—4 in Figure 1;

Figure 5, an elevation of the lamp converted for use as a stop-light and a license plate illuminator as well as a direction indicator at the rear end of a vehicle;

Figure 6 a section taken on the line 6—6 Figure 5;

Figure 7 a diagrammatic view of the circuits employed in the operation of a lamp of the type shown in Figures 5 and 6; and, Figure 8 a similar view of the circuit used in operating the direction indicating lamp illustrated in Figures 1 to 4 inclusive.

Referring first of all to Figures 1 to 4, the signal lamp illustrated therein comprises a base part 5 provided with a lug 6 or other means for its attachment to the filler neck of the radiator at the front of a motor vehicle, and a top part 7 removably fastened upon the base part by means of a screw 8.

The two parts are preferably made of metal, stamped or otherwise formed in the required shape, or they may be composed of wood or fiber or any other material as may be found most suitable for the purpose. The base part of the device has a bottom chamber 9, and above the same three upright cylinders 10 which are open at the upper surface of the part. Sockets 12 for the application of incandescent light globes 13, fastened upon the bottom chamber of the base part extend loosely in the three cylinders, and the wires of the globes inserted in the sockets, projected through apertures at the lower ends of the cylinders into the chamber 9 as shown in Figure 3. The globes are held in place by studs 14 sliding in bayonet-slots of the respective sockets.

The top part of the signal lamp comprises a hollow casing having a central compartment 15 and end compartments 16 and 17, divided by partitions 18. The three compartments have bottom openings to receive the globes in the sockets of the lower part of the lamp and the central compartment has a sleeve 19 which when the two parts are assembled, one upon the other, extends in the space between the central cylinder of the lower part and the respective socket. The sleeve has an aperture to receive the end-portion of the before-mentioned screw 8 which projects through a correspondingly threaded opening of the base. The two parts are by this means rigidly fastened together, while the upper part is readily removed to afford access to the light globes. The central compartment of the top part of the lamp is rectangular and the end-compartments are made in the form of truncated tetragonal bipyramids. The three compartments are axially in horizontal alinement and the outer compartments exceed at their points of greatest area, the corresponding dimensions of the center compartment, to better divide the light beams emitted from the compartments as will be hereinafter more fully described.

The central compartment has in its top an opening 20 and in its front and rear-surfaces, openings 21 and 22, the partitions between the compartments have openings 23 and the outer compartments have in the converging front and rear faces of their outer pyramidal portions, openings 24 and at the outer ends or apexes of said portions small openings 25. All of the above mentioned openings are covered by glass, preferably colored, and the colors may be varied according to different requirements. The front glass of the middle compartment may, for example, be red, the rear glass of the same compartment, green, the glass covering the opening in the top of the compartment can be green or red and the glass in the partitions between the compartments, green.

The glasses covering the openings 24 in the converging sides of the outer compartments of the lamp may be the same in both compartments, white being preferred, or they may be differently colored, as for example, red and green to better indicate the direction in which the vehicle to which the lamp is applied, is about to turn. The glasses closing the end openings 25 of the compartments 16 are preferably red.

In the operation of the signal lamp, the center globe is lit constantly as a warning of approach to pedestrians or vehicles travelling in opposite direction, the front opening emitting a forwardly directed light beam and the top-opening an upwardly directed beam. The rear-opening 22 is of advantage to the occupants of the vehicle in illuminating the front portion of the vehicle and in indicating that the signal lamp is in operative condition. The openings 23 in the partitions between the compartments, transmit under the same conditions, a diffused glow to the outer compartments which may be dimly seen through the openings in the sides and ends of the compartments.

The illumination of the lamp by means of the central globe moreover, is highly ornamental and decorative, particularly at night. When it is desired to turn the vehicle to either the right or the left, warning is given by the selective incandescence of the globes in the end-compartments, it being apparent that illumination of the right hand compartment will comprehensively indicate that the driver of the vehicle intends to turn to the right, while illumination of the left compartment will show an intended movement in the opposite direction.

The peculiar shape of the end-compartments is of particular value in the direction indicating function of the device, because the openings in the converging sides and ends of these compartments permit of the signal being observed with equal distinctness to those approaching the vehicle, those following the vehicle and those at a side of the same. Because of the fact that the outer compartments of the lamp are greater in cross-section from top to bottom relative to the middle compartment, that is, a greater vertical area than that of the middle compartment, confusion is prevented between the light-beams emitted from the center compartments and those passing through the openings of either end-compartment.

In order to lengthen the usefulness of the incandescent globes they are cooled by the circulation of air admitted to the casings through apertures 26 and passing through the spaces between the sockets of the globes and the respective cylinders of the base portion of the lamp. The openings 26 are formed laterally in the inner portions of the end-compartments so that they are covered against the emission of forwardly directed light beams which might detract from the effectiveness of the device. The front glass 27 of the lamp, preferably made in the form of a lens, may have a marginal portion of reflective material, as indicated at 28 in Figure 4, to produce a glow by reflection of light from headlights of approaching vehicles in case the signal lamp is in an inoperative condition or the center globe is broken or burnt out.

The signal lamp is connected in a circuit with the battery of the vehicle as shown in Figure 8 in which 29 indicates the source of electricity, 30 the circuit of the center lamp, controlled by a switch 31, 32 the circuit of the right hand lamp, controlled by a switch 33, and 34 the circuit of the left hand lamp, controlled by a switch 35. The switch 31 of the circuit is constantly closed in the operation of the lamp as stated hereinbefore, and the switches of the circuits of the end lamps are preferably placed on the steering wheel of the vehicle to be within easy reach of the driver.

The top and the rear side-wall of the middle section of the lamp may be separate and removably attached to the casing for the purpose of converting the lamp to one adapted for use at the rear end of the vehicle. The lamp thus converted has been illustrated in Figures 5 and 6. The top-wall of the lamp is replaced by a hollow top 36 of ornamental form, containing a lamp-socket 37, and an incandescent lamp 38 in the socket, and having in its front face a glass-covered opening 39 and at its apex a smaller glass-covered opening 40. The rear wall of the lamp is replaced by a flanged cover 41 having a lower wall provided with a glass-covered opening 42 to illuminate a license plate below the place at which the lamp is installed.

The rear wall of the cover has a glass-covered opening 43 which performs a function equivalent to that of the opening 22 of the lamp of the first described construction. In the operation of a lamp of the modified construction illustrated in Figures 5 and 6, the glass-covered opening 21 functions as a "tail signal", the opening 39 as a "stop signal," and the openings 24 in the converging sides of the end-sections of the lamp as direction-indicators as before. The circuits of the lamp have been illustrated in Figure 7 in which the circuit 44 of the stop lamp 38, is controlled by a switch 45 which is closed by the movement of the pedal 46 of the brake-system of the vehicle when the brakes are being set.

Having thus described my signal lamp, I desire it understood that modifications and changes in construction, form and arrangements of parts may be resorted to without departing from the spirit of the invention as defined in the following claims.

What I claim and desire to secure by Letters Patent is:

1. A signal lamp for motor vehicles, comprising a casing having a middle compartment provided with a glass covered opening, side compartments having converging front and rear walls, a glass covered opening in each of said walls, light pervious partitions separating the compartments, and means to mount a lamp in said middle compartment.

2. A signal lamp for motor vehicles, comprising a casing having a middle compartment provided with a glass covered opening, side compartments having converging sides provided with glass covered openings, partitions separating the compartments and having glass covered openings, and means to mount lamps in the compartments.

3. A signal lamp for motor vehicles, comprising a casing having a middle compartment, provided with a glass covered opening and side compartments each provided with a glass covered opening, partitions separating the compartments and having glass covered openings, and means to mount lamps in the compartments.

4. A signal lamp for motor vehicles, comprising a casing having a plurality of compartments provided with glass covered openings in the front and rear walls thereof, partitions between the compartments having glass covered openings, and means to mount lamps in the compartments.

5. A signal lamp for motor vehicles, comprising a middle compartment and side compartments on either side of the compartment, having glass covered openings, visible along a line of travel of the vehicle, light pervious partitions between the compartments and a lamp in each compartment.

6. A signal lamp for motor vehicles, comprising a middle compartment and side compartments on either side, the compartments having glass covered openings, light pervious partitions between the compartments, a lamp in each compartment, and means to color the light from the middle compartment during transmission thereof to the side compartments, whereby said light causes the side compartments to shed a light that when the lamps of the side compartments are not lit is differently colored from that shed by the side compartments when the lamps in the side compartments are lit.

7. A signal lamp for motor vehicles comprising a middle compartment and side compartments on either side, the compartments having glass covered openings, light pervious partitions between the compartments, a lamp in each compartment, and glass in the compartment openings of a different color from that of the light pervious portions of the partitions, whereby a light in the middle compartment causes the side compartments to shed a light that when the lamps of the side compartments are not lit, is differently colored from that shed by the side compartments when the lamps in the side compartments are lit.

8. A signal lamp for motor vehicles comprising a middle compartment and side compartments on either side, the compartments having glass covered openings visible along a line of travel of the vehicle, light pervious partitions between the compartments, said partitions being formed of a material colored differently from that of the glass in said openings, and a lamp in each compartment.

9. A signal lamp for motor vehicles, comprising a casing having a middle compartment provided with a glass covered opening, side compartments of truncated, tetragonal bipyramidal form having glass covered openings in their converging front and rear walls, and means to mount a lamp in the middle compartment.

10. A signal lamp for motor vehicles, comprising a casing having a middle compartment provided with a glass covered opening, side compartments of truncated tetragonal bipyramidal form having glass covered openings in their converging outer sides, and means to mount lamps in the compartments, said side compartments having a maximum vertical area larger than the maximum vertical area of the middle compartment.

11. A signal lamp for motor vehicles, comprising a lamp casing having a center and side compartments, glass covered openings in said compartments, a lamp in each of said compartments, a removable top portion for one compartment, and a signal lamp unit interchangeable with said top portion.

12. A signal lamp for motor vehicles, comprising a lamp casing having a plurality of compartments, glass covered openings for each compartment, a lamp in each compartment, said casing having a removably attached top portion, a second signal lamp unit interchangeable with said top, whereby said lamp may be converted from a lamp casing usable at the front of the vehicle to a lamp casing usable at the rear.

13. A signal lamp for motor vehicles, comprising a lamp casing having center and side compartments, glass covered openings in said compartments, a lamp in each of said compartments, a removable back wall portion for one compartment, and a signal lamp unit including a rear wall portion interchangeable with said removable back wall portion.

14. A signal lamp for motor vehicles, comprising a lamp casing having center and side compartments, glass covered openings in said compartments, a lamp in each of said compartments, a removable top portion and back wall portion for one compartment, and a signal lamp unit including a rear wall portion, interchangeable with said top portion and back wall portion.

15. A signal lamp for motor vehicles, comprising a base section having a projecting cylinder, a lamp socket in the cylinder spaced from the inner surface thereof, an upper section supported on the base section, comprising a plurality of signal compartments, a sleeve on the upper section between the socket and the cylinder, said sleeve and cylinder having registering apertures and screw means in the apertures holding the sections firmly together, said upper section with its compartments being removable from the base section, as a unit.

16. A signal lamp for motor vehicles, comprising a hollow casing having a central compartment and side compartments, and a base section having lamp sockets for each of said compartments and a projecting cylinder concentric with one of said sockets, said compartments having bottom openings to receive the sockets of said base section, one of said compartments having a sleeve adapted to telescope with said projecting cylinder, and means to hold said sleeve and cylinder in rigid engagement with each other.

In testimony whereof I have hereunto affixed my signature.

EMILE A. LAURENT.